United States Patent

Cox

Patent Number: 5,305,988
Date of Patent: Apr. 26, 1994

[54] VALVES HAVING INVOLUTE SEALING SURFACES

[75] Inventor: Don C. Cox, Roanoke, Tex.

[73] Assignee: Halliburton Company, Houston, Tex.

[21] Appl. No.: 949,939

[22] Filed: Sep. 24, 1992

[51] Int. Cl.$^5$ ............................................. F16K 5/00
[52] U.S. Cl. .................................. 251/309; 166/330
[58] Field of Search ............... 251/309, 312, 314, 298, 251/291, 292; 137/327; 166/330, 331

[56] References Cited

U.S. PATENT DOCUMENTS

| | | | |
|---|---|---|---|
| 3,051,243 | 8/1962 | Grimmer et al. | 166/224 |
| 3,211,232 | 10/1965 | Grimmer | 166/194 |
| 3,484,078 | 12/1969 | Haenky | 251/312 X |
| 3,552,718 | 1/1971 | Schwegman | 251/291 |
| 3,610,337 | 10/1971 | Lewis | 166/331 |
| 3,845,815 | 11/1974 | Garwood | 166/154 |
| 4,640,492 | 2/1987 | Carlson, Jr. | 251/163 |

FOREIGN PATENT DOCUMENTS 148608  1/1983  Norway ........................ 251/309

OTHER PUBLICATIONS

Composite Catalog 1992–1993, p. 1216, vol. 1, p. 3283, vol. 2.

*Primary Examiner*—Martin P. Schwadron
*Assistant Examiner*—Kevin L. Lee
*Attorney, Agent, or Firm*—Tracy W. Druce; Roland O. Cox

[57] ABSTRACT

Two embodiments of a metal valve, each having a body with flow passages and curved internal sealing surfaces and a valve member with a flow passage and external curved sealing surfaces. Both the body and valve member sealing surfaces are curved as a portion of the involute of a circle and are sealingly engageable. The valve member is mounted in the body for rotation between open and closed positions, permitting and preventing flow through valve.

17 Claims, 4 Drawing Sheets

VALVES HAVING INVOLUTE SEALING SURFACES

BACKGROUND OF THE INVENTION (1) Field of the Invention

This application pertains to valves and particularly pertains to valves having a valve member which is mounted in a body and rotated between open and closed positions.

(2) Background Information

Quite a number of valves have been developed which utilize resilient sealing materials for sealing between internal valve parts and metal valves and metal seats which rub on each other through the full arc as the valve member is rotated between open and closed positions. The resilient sealing materials often deteriorate rapidly as affected by high temperatures, chemical action, and possibly erosion to a condition in which they no longer seal internal valve parts to one another. After metal valves and seats rub on each other through full turning arcs numerous times, metal sealing surfaces tend to gall ruining one or both of the sealing surfaces for sealing engagement with each other resulting in valve leakage. Particles of grit on metal sealing surfaces also may damage these surfaces to no longer sealingly engage. To have a reliable seal, the metal-to-metal valve and seats should have large areas for sealing engagement and should sealingly engage throughout the entire contacting area.

A mathematical analysis was made of arcs of circles, involutes, archimedean spirals, logarithmic spirals, epicycloids and hypocycloids to determine the most desirable curved surface for metal sealing surfaces. The involute of a circle was found to have all the required characteristics. The location of points on the involute curve was calculated and it was found there were a number of existing manufacturing processes which could be used to form involute curves on metal valve members and in metal valve bodies.

DISCLOSURE OF INVENTION

The valves of the present invention utilize a metal valve member, a metal seat member and have no resilient material seals which may deteriorate. The sealing surfaces on the valve member and seat member are curved portions formed according to the mathematical formula for the involute of a circle, which is defined in polar coordinates by:

$$\Theta = \sqrt{R^2/A^2 - 1} - \text{ARCTAN}\sqrt{R^2/A^2 - 1}$$

where:
- A = radius of the base circle,
- R = radius from the center of the base circle to a point on the involute, and
- Θ = angle of revolution about the center of the base circle from the starting point of the involute to R.

By rotating the valve member relative to sealing surfaces in the body, flow passages in the body are closed or opened to flow. The involute shape of the sealing surfaces ensures sealing engagement throughout the entire area of contact between the two sealing surfaces and provides immediate separation of the sealing surfaces on any rotation, which prevents rubbing of one sealing surface on the other throughout the total angle the valve member is rotated. It should be easily recognized by all with ordinary skill in valve art that involute curved sealing surfaces are applicable to valve and seat members in many types of valves, which control fluid flow.

An object of this invention is to provide an all metal valve for use in high temperature and/or corrosive environments, having no resilient material seals.

Another object of this invention is to provide an all metal valve, which has an all metal valve member with a metal sealing surface and an all metal body with a metal sealing surface wherein the metal valve member is rotatable between open and closed positions.

Another object of this invention is to provide an all metal valve wherein the body sealing surfaces and valve member sealing surfaces are curved as portions of an involute of a circle and the valve member sealing surfaces and body sealing surfaces are sealingly engaged when the valve member is rotated to closed position.

Another object of this invention is to provide a metal valve having involute curved sealing surfaces on the rotatable valve member and in the body so when the valve member is rotated from closed to open position, a clearance between the valve member and body sealing surfaces is created on any rotation of the valve member and the clearance prevents erosion or flow cutting of the sealing surfaces and the valve member sealing surfaces do not rub on the body sealing surfaces as the valve member is rotated to open position and back to closed position.

Also an object of this invention is to provide an all metal valve which consistently requires little torque to rotate the valve member from closed to open position and back to closed position, regardless of how high the pressure differential is across the closed valve.

DESCRIPTION OF AN EMBODIMENT

Figure 1:
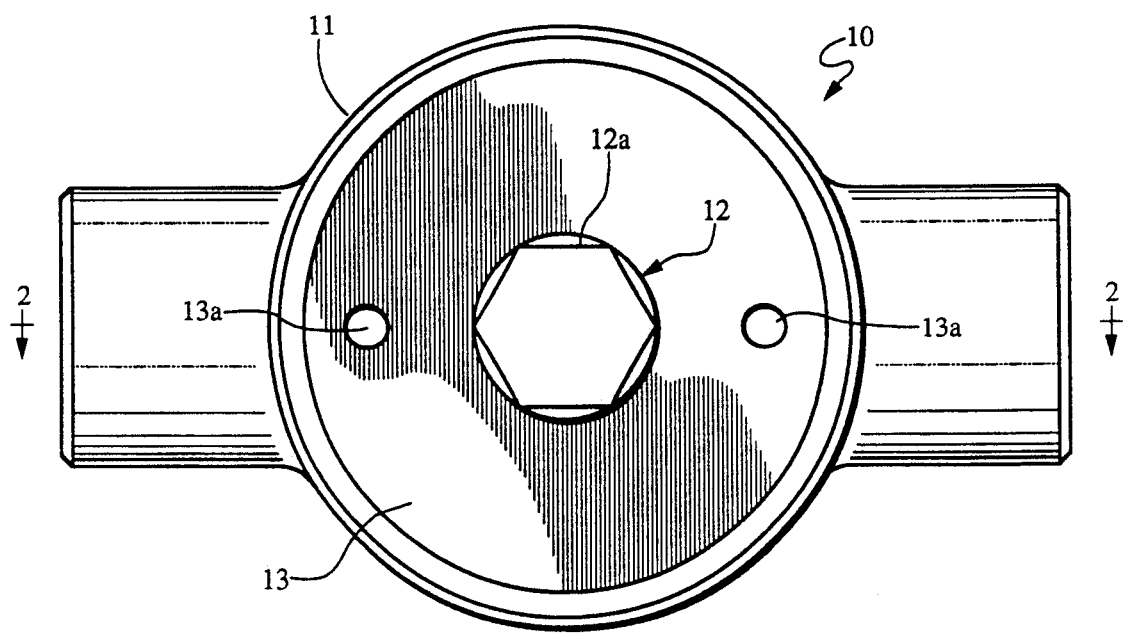
FIG. 1 is a plan view of one embodiment of the valve member of this invention.
Figure 2:
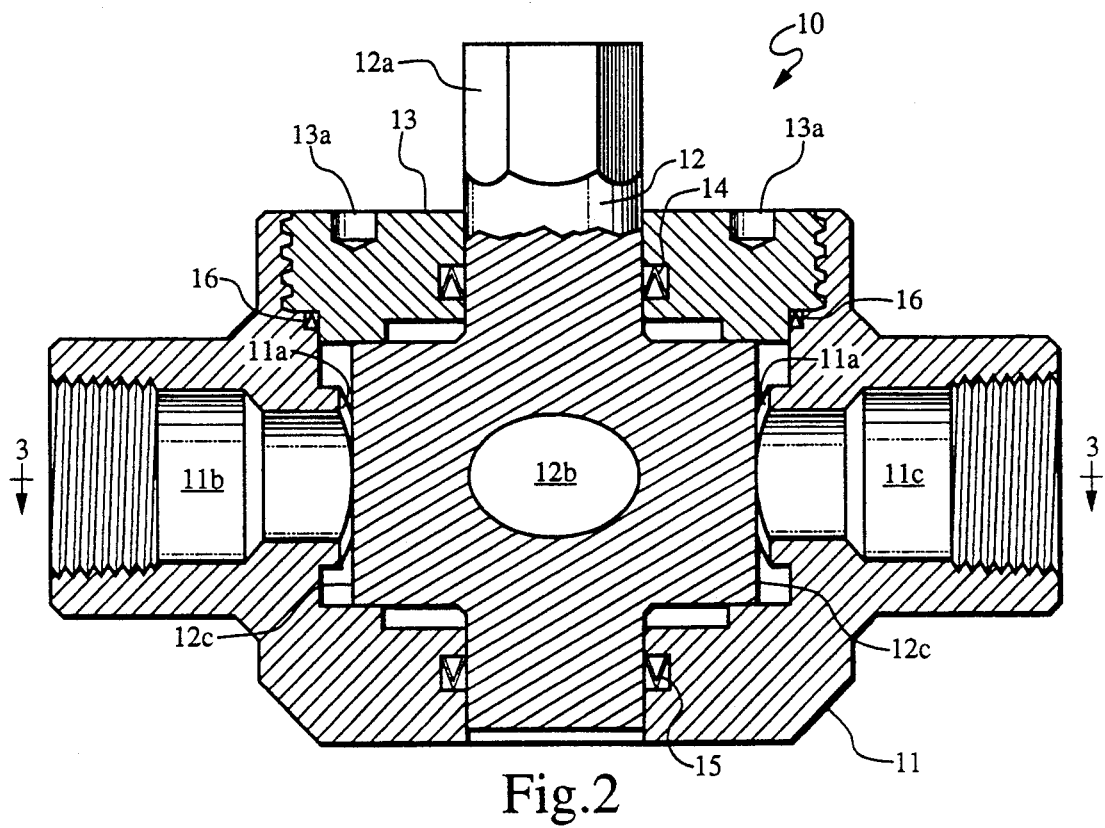
FIG. 2 is a view in partial cross-section taken along line 2—2 of FIG. 1 showing the valve member.

FIG. 1 shows the valve 10 of this invention which includes a body 11 and a valve member 12 rotatably mounted in the body. The valve member has a stem with wrench flats 12a, a through flow passage 12b and two identical sealing surfaces 12c—see FIG. 2. The valve member is positioned for rotation in the body by a bonnet 13 secured in the body and the valve member stem is sealed to the bonnet by a metal seal 14 and to the body by a metal seal 15. The bonnet has holes 13a into which a spanner wrench may be fitted to secure the bonnet in the body. The bonnet is sealed to the body by another metal seal 16. In the body are two identical curved sealing surfaces 11a, which are sealingly engageable with curved valve member sealing surfaces 12c, and flow passages 11b and 11c. Sealing surfaces 11a and 12c are formed as portions of involute curves according to the previously stated formula (see FIGS. 3, 4 and 5). Valve member sealing surfaces sealingly engage body sealing surfaces when the valve member is rotated to closed position as shown in FIG. 5, and flow between flow passages 11b and 11c through flow passage 12b is prevented.

Figure 3:
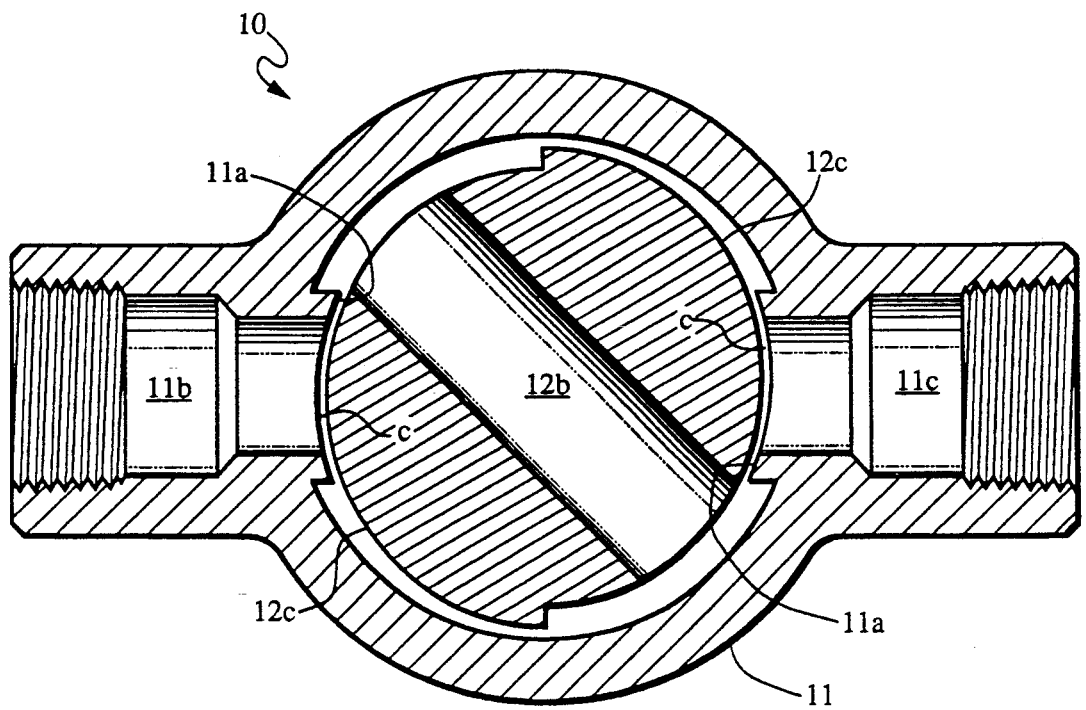
FIG. 3 is a view in partial cross-section taken along line 3—3 of FIG. 2 showing the valve member between open and closed position.
Figure 4:
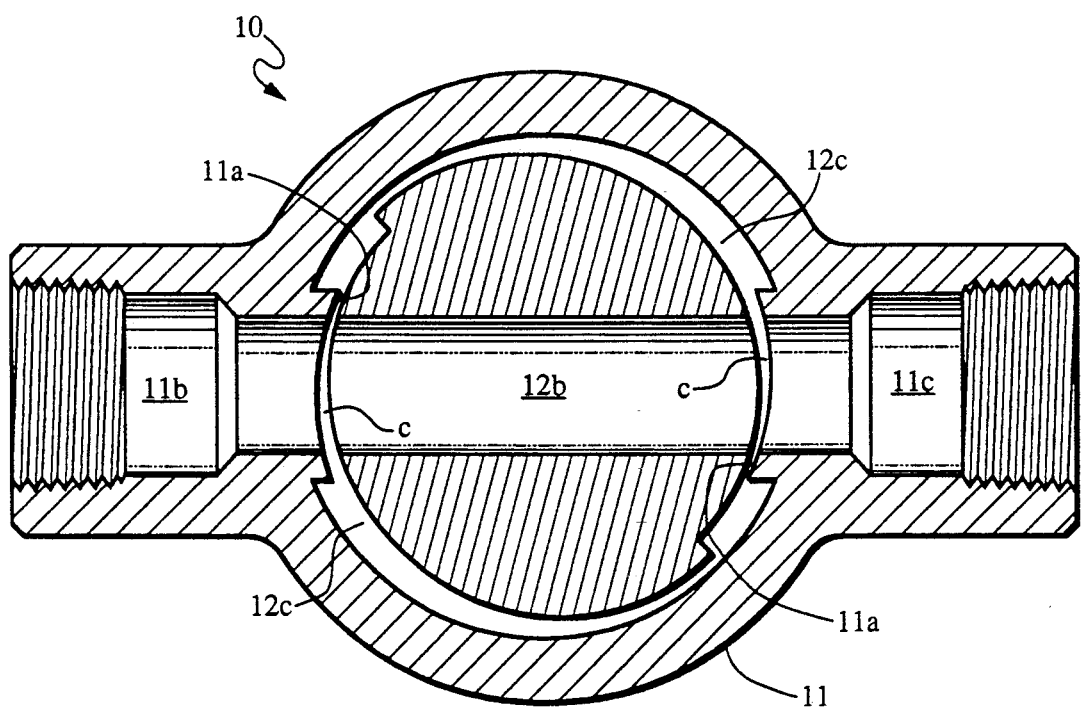
FIG. 4 is a view in partial cross-section taken along line 3—3 of FIG. 2 showing the valve member in open position.
Figure 5:
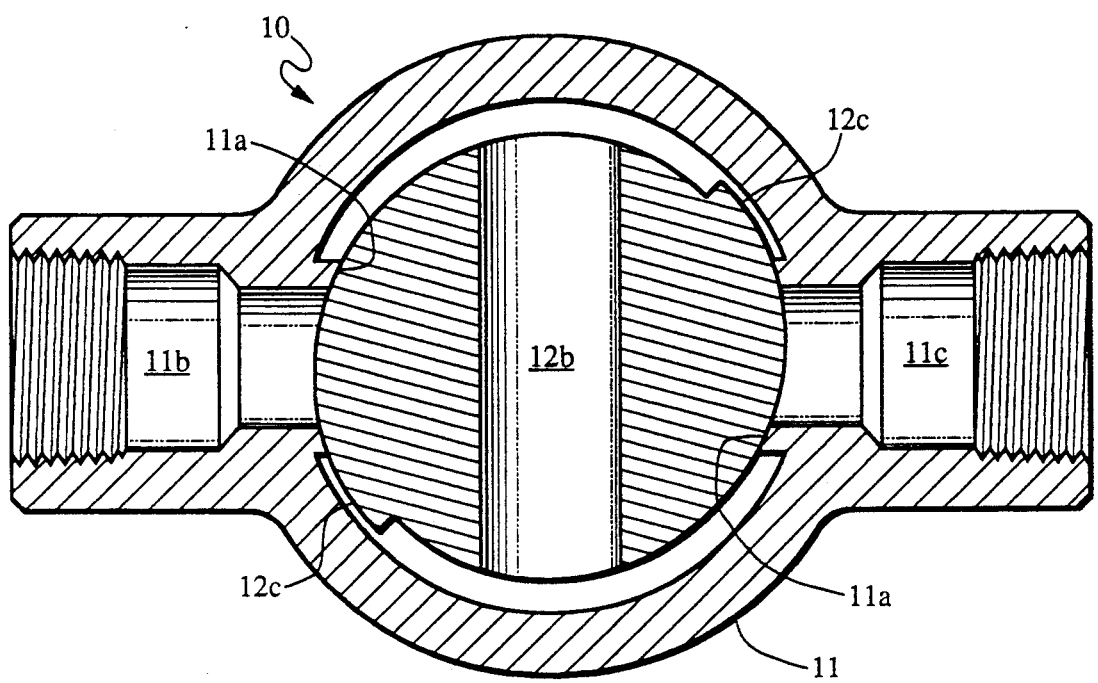
FIG. 5 is a view in partial cross-section taken along line 3—3 of FIG. 2 showing the valve member in closed position.

When the valve member is rotated from closed position toward open position as shown in FIG. 3, the valve sealing surfaces immediately move away from the body sealing surfaces a clearance c distance and no rubbing occurs between the sealing surfaces as the valve member is rotated to full open position shown in FIG. 4. When the valve is open, flow may occur between flow passages 11b and 11c through flow passage 12b.

Clearance c between valve member sealing surfaces and body sealing surfaces is established immediately on rotation of the valve member and increases to a maximum when the valve member is in open position as shown in FIGS. 3 and 4.

DESCRIPTION OF THE PREFERRED EMBODIMENT

Figure 6:
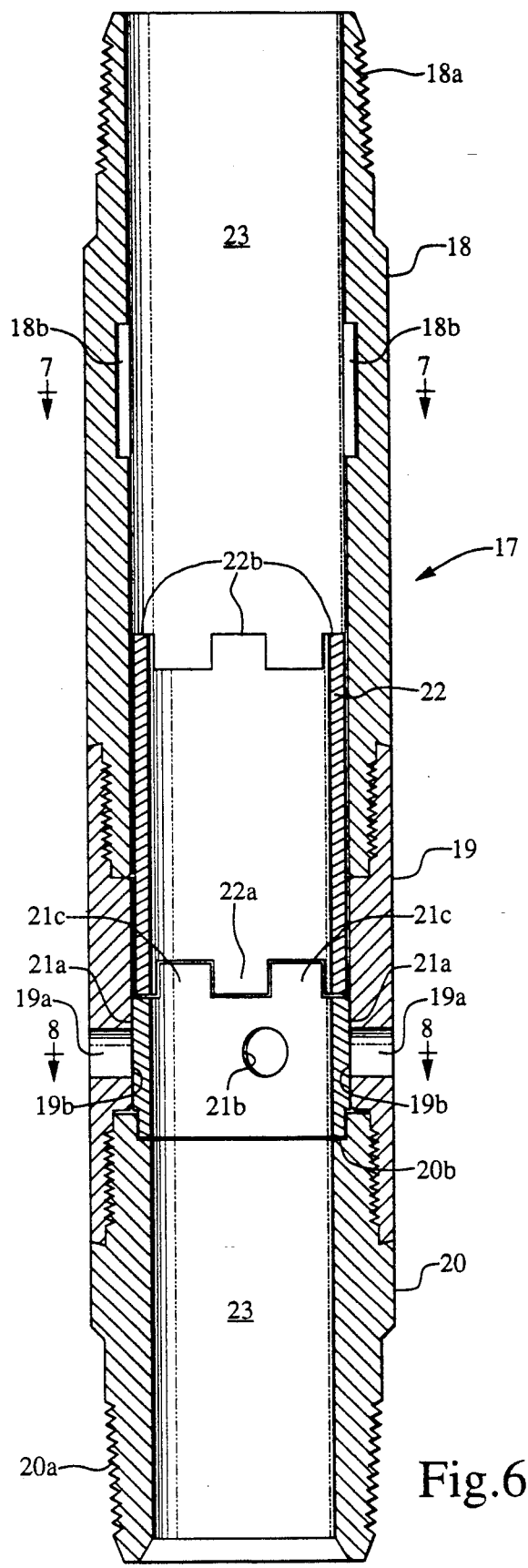
FIG. 6 is an elevational view in section of an embodiment of the invention for use in a well flow conduit.

The preferred embodiment of the valve of this invention 17 is shown in FIG. 6. This embodiment may be connected in a well flow conduit, lowered into a larger well conduit and be rotated between open and closed positions by a rotary positioning tool (not shown), which is lowered into the conduit and engages the valve. The outside diameter of valve 17 has been reduced and the inside diameter has been increased for compatibility with standard well conduit sizes.

Figure 7:
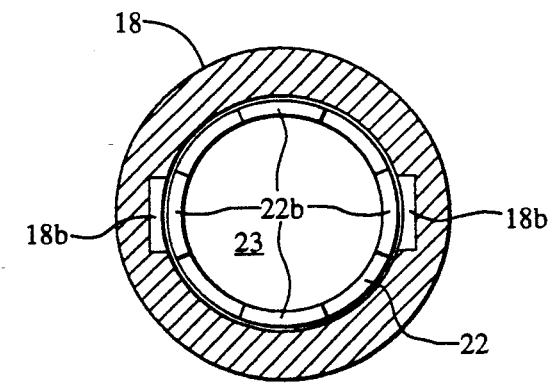
FIG. 7 is a cross-sectional view taken along line 7—7 of FIG. 6 showing recesses used in the rotation of the valve member.
Figure 8:
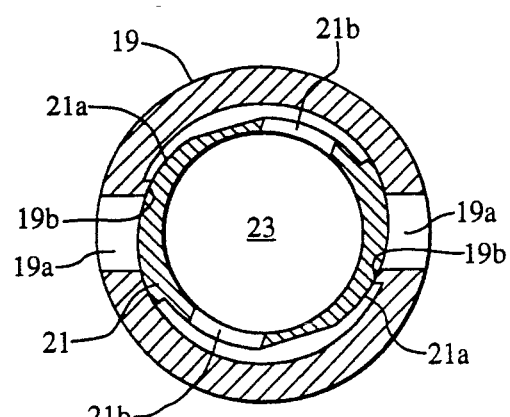
FIG. 8 is a cross-sectional view taken along line 8—8 of FIG. 6 showing the valve member in closed position.
Figure 9:
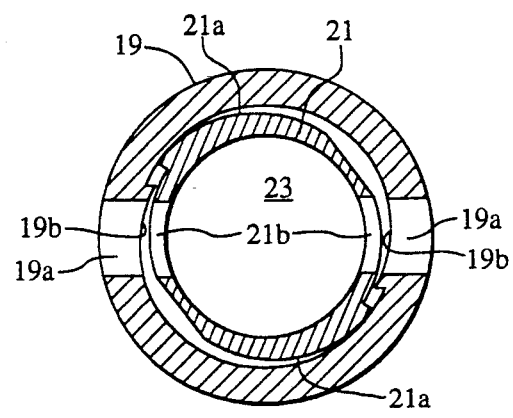
FIG. 9 is a cross-sectional view taken along line 8—8 of FIG. 6 showing the valve member in open position.

Valve 17 includes a connector 18 having an appropriate thread 18a for connection into a well conduit and recesses 18b (FIG. 7) into which the positioning tool connects for operation to rotate the valve member. The connector is sealably connected to a body 19 having flow passages 19a. Inside the body are curved sealing surfaces 19b, each curved as a portion of an involute curve, see FIGS. 8 and 9. A lower body 20 is sealably connected to body 19 and has an appropriate thread 20a for connection into a conduit and a bearing surface 20b. Mounted for rotation on the bearing surface and in the body is a valve member 21. The valve member has sealing surfaces 21a, each surface is formed as a portion of an involute curve which is sealingly engageable with body involute curve sealing surfaces 19b. Valve member 21 also has flow passages 21b and is connected to a rotatable member 22 through meshing projections 21c on the valve member and 22a on the rotatable member. The rotatable member also has projections 22b engageable by a rotary positioning tool, for rotating member 22 and valve member 21 between open and closed positions in bodies 19 and 20. Valve 17 also has a longitudinal through flow passage 23. When the rotatable member is rotated clockwise by the positioning tool, the valve member is rotated to closed position as shown in FIG. 8 and flow between flow passage 23 through flow passages 21b and outside the valve 17 is prevented. When the positioning tool is operated to rotate member 22 and valve member 21 counterclockwise, flow passages 21b are aligned with flow passages 19a as shown in FIG. 9 and flow may occur between valve flow passage 23 through passages 21b and outside the valve.

Testing to date of a valve with involute sealing surfaces revealed opening and closing the valve numerous times against very high pressure differentials has not damaged the involute sealing surfaces or degraded their sealing ability. A surprise finding during tests was that the torque to open the valve remains very low and essentially the same no matter how high the pressure differential across the closed valve.

Also, as clearance between the valve member sealing surfaces and body sealing surfaces occurs immediately on any rotation of the valve member and increases to a maximum when the valve member is in open position, flow cutting by flow between the valve sealing surfaces and body sealing surfaces has been found to be nil.

What I claim is:

1. A valve comprising:
   (a) a body having inlet and outlet flow passages and inlet and outlet flow passage sealing surfaces therein, said inlet and outlet sealing surfaces formed as a portion of the curve of an involute of a circle; and
   (b) a valve member having a flow passage therethrough mounted for rotation between open and closed positions in said body, said valve member having sealing surfaces thereon, each said sealing surface formed as a portion of the curve of an involute of a circle, said valve member sealing surfaces sealingly engageable with said body inlet and outlet sealing surfaces.

2. The valve of claim 1 wherein the curve of an involute of a circle is defined in polar coordinates by:

$$\Theta = \sqrt{R^2/A^2 - 1} - \text{ARCTAN}\sqrt{R^2/A^2 - 1}$$

where:
   A = radius of the base circle,
   R = radius from the center of the base circle to a point on the involute, and
   $\Theta$ = angle of revolution about the center of the base circle from the starting point of the involute to R.

3. The valve of clam 2 wherein the body and valve member are metal.

4. A valve comprising:
   (a) a body having inlet and outlet flow passages and inlet and outlet sealing surfaces therein, said inlet and outlet sealing surfaces formed as a portion of the curve of an involute of a circle;
   (b) a valve member having a flow passage therethrough and sealing surfaces thereon, each said sealing surface formed as a portion of the curve of an involute of a circle, said valve member sealing surfaces sealingly engageable with said body sealing surfaces and said valve member rotatably mounted in said body;
   (c) a bonnet connected in and sealed to said body; and
   (d) means for sealing said valve member in said body and bonnet.

5. The valve of claim 4 wherein the body, valve member and bonnet are metal.

6. The valve of claim 4 wherein the bonnet is sealed to the body with a metal seal and the means for sealing the valve member in the body and bonnet are metal seals.

7. A valve comprising:

(a) a metal body having flow passages and involute curved sealing surfaces therein;

(b) a metal valve member having a flow passage therethrough and involute curved sealing surfaces thereon, said valve member curved sealing surfaces sealingly engageable with said body curved sealing surfaces, said valve member rotatably mounted and sealed in said body with a metal seal, said valve member and body involute sealing surfaces formed as a portion of the involute of a circle, said involute is defined in polar coordinates by:

$$\Theta = \sqrt{R^2/A^2 - 1} - ARCTAN\sqrt{R^2/A^2 - 1}$$

where:
A = radius of the base circle,
R = radius from the center of the base circle to a point on the involute, and
Θ = angle of revolution about the center of the base circle from the starting point of the involute to R; and (c) a metal bonnet connected in and sealed to said body with a metal seal, said valve member sealed for rotation in said bonnet with a metal seal.

8. A valve having a longitudinal flow passage therethrough, said valve comprising:

(a) a connector having a thread thereon and recesses therein, said connector sealably connected to (b) a cylindrical body having a wall with flow passages therethrough and sealing surfaces therein, said sealing surfaces formed as a portion of the curve of an involute of a circle, said body sealably connected to a (c) lower body having a thread thereon;

(d) a valve member mounted for rotation in said lower body, said valve member having flow passages therethrough and sealing surfaces thereon, said sealing surfaces formed as a portion of the curve of an involute of a circle, said valve member sealing surfaces sealingly engageable with said body sealing surfaces; and (e) means for rotating said valve member between open position, where said body and valve member flow passages are aligned to permit flow between said valve longitudinal flow passage and outside said valve, and closed position, where said valve member sealing surfaces sealingly engage said body sealing surfaces and close said body and valve member flow passages to flow.

9. The valve of claim 8 wherein the means for rotating the valve member comprises:

(a) projections on the valve member;

(b) the connector recesses, wherein a rotary positioning tool is connectable; and (c) a rotatable member disposed in said body, said rotatable member having upper and lower projections, said lower projections meshing with said valve member projections.

10. The valve of claim 8 wherein the valve member sealing surfaces and body sealing surfaces are formed as a portion of the curve of an involute of a circle, said involute is defined in polar coordinates by:

$$\Theta = \sqrt{R^2/A^2 - 1} - ARCTAN\sqrt{R^2/A^2 - 1}$$

where:
A = radius of the base circle,
R = radius from the center of the base circle to a point on the involute, and
Θ = angle of revolution about the center of the base circle from the starting point of the involute to R.

11. The valve of claim 8 wherein the body and valve member are metal.

12. The valve of claim 11 wherein the connector and lower body are metal.

13. A valve comprising:

(a) a body having flow passages therethrough and sealing surfaces therein, said sealing surfaces formed as a portion of the curve of an involute of a circle;

(b) a valve member mounted for rotation in said body, said valve member having flow passages therethrough and sealing surfaces thereon, said sealing surfaces formed as a portion of the curve of an involute of a circle, said sealing surfaces sealingly engageable with said body sealing surfaces; and (c) means for rotating said valve member between open position, where said body and said valve member flow passages are aligned, and closed position, where said valve member sealing surfaces sealingly engage said body sealing surfaces and close said body and valve member flow passages to flow.

14. The valve of claim 13 further including a connector and a lower body for connecting the body into a flow conduit, said connector having recesses therein.

15. A valve comprising:

(a) a body having flow passages therethrough and sealing surfaces therein, said sealing surfaces formed as a portion of the curve of an involute of a circle;

(b) a valve member mounted for rotation in said body, said valve member having flow passages therethrough and sealing surfaces thereon, said sealing surfaces formed as a portion of the curve of an involute of a circle, said sealing surfaces sealingly engageable with said body sealing surfaces; and (c) means for rotating said valve member between open position, where said body and said valve member flow passages are aligned, and closed position, where said valve member sealing surfaces sealingly engage said body sealing surfaces and close said body and valve member flow passages to flow;

a connector and a lower body for connecting the body into a flow conduit, said connector having recesses therein; and said means for rotating the valve member between open and closed positions comprises:

(a) recesses in the connector;

(b) projections on the valve member; and (c) a rotatable member in the body, said rotatable member having projections meshing with said valve member projections.

16. The valve of claim 15 wherein the rotatable member further includes projections not meshing with the valve member projections.

17. A valve having a longitudinal flow passage therethrough, said valve comprising:

(a) a metal connector having a thread thereon and recesses therein for connection of a positioning tool, said connector sealably connected to (b) a cylindrical metal body having a wall with flow passages therethrough and involute curved sealing surfaces in said body, said body sealably connected to a (c) metal lower body having a thread thereon and a bearing surface therein;

(d) a metal valve member mounted for rotation on said lower body bearing surface, said valve member having flow passages therethrough, involute curved sealing surfaces and projections thereon, said valve member curved sealing surfaces sealingly engageable with said curved body sealing surfaces, said valve member and body sealing surfaces curved as a portion of an involute of a circle which is defined in polar coordinates by:

$$\Theta = \sqrt{R^2/A^2 - 1} - ARCTAN\sqrt{R^2/A^2 - 1}$$

where:

A = radius of the base circle,

R = radius from the center of the base circle to a point on the involute, and $\Theta$ = angle of revolution about the center of the base circle from the starting point of the involute to R; and (e) means for rotating said valve member between open position, aligning said valve member flow passages with said body flow passages and permitting flow between said valve longitudinal flow passage and outside the valve and closed position, preventing flow between said valve longitudinal flow passage and outside the valve, said means for rotating said valve member comprising:

said connector recesses, a rotatable member in said body, said rotatable member having projections on one end meshing with said valve member projections and projections on the other end for engagement by a rotatable positioning tool.

* * * * *